United States Patent Office 3,655,766
Patented Apr. 11, 1972

3,655,766
PHOSPHORANYLIDENE SUBSTITUTED
CYCLIC COMPOUNDS
Gail H. Birum, Kirkwood, and Clifford N. Matthews, St. Louis, Mo., assignors to Monsanto Company, St. Louis, Mo.
No Drawing. Continuation-in-part of application Ser. No. 567,066, July 22, 1966. This application June 7, 1968, Ser. No. 735,190
Int. Cl. C07c 49/27
U.S. Cl. 260—586 R
2 Claims

ABSTRACT OF THE DISCLOSURE

Stable, ylide-substituted 1,3-cyclobutanediones are synthesized from triorganophosphoranylideneketene and aldehydes or active ketones. Analogous adducts are formed from triorganophosphoranylideneketene and ketenes in a one-step reaction. In contrast to the above reactions yielding substituted 1,3-cyclobutanediones, reaction of aryl isocyanates with triorganophosphoranylideneketene results in 2:1 adducts having six-membered ring structures. The new compounds are useful as fire retardants, biological toxicants, plasticizers, textile treating agents and lubricant additives.

CROSS-REFERENCES TO RELATED APPLICATIONS

This is a continuation-in-part of application Ser. No. 567,066, filed July 22, 1966, now U.S. Pat. No. 3,459,804 issued Aug. 5, 1969.

BACKGROUND OF THE INVENTION

Triphenylphosphoranylideneketene (I) is a surprisingly stable compound (M.P. 172–173.5°) obtained by thermal cleavage of [(carboxy)(triphenylphosphoranylidene) methyl]triphenylphosphonium inner salt (II). This reaction (Equation 1) and other triorganophosphoranylideneketenes are described in further detail in copending application Ser. No. 567,066, filed July 22, 1966, which is incorporated herein by reference.

Eq. 1

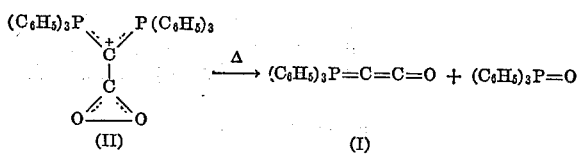

Structurally, triorganophosphoranylideneketenes can be regarded as both ylides and as ketenes.

Recently issued U.S. Pat. 3,359,321, Samuel E. Ellzey, Jr. applicant, discloses the preparation of (perfluorodioxocycloalkyl)triphenylphosphonium betaines by the reaction of triphenyl phosphine and chlorofluoro cyclic olefins. The patent assigns to the new compounds disclosed therein the formula

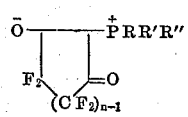

The assigned formula is an equivalent expression for

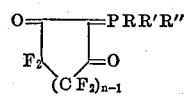

SUMMARY OF THE INVENTION

In accordance with this invention there is provided compounds and a process for making the compounds of the formula

wherein each D is selected from the group consisting of alkyl, aryl, haloaryl, haloaralkyl, alkaryl, and aralkyl groups containing up to 20 carbon atoms and free of nonbenzoid unsaturation;

E is selected from the group consisting of

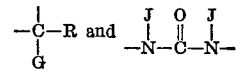

Y is selected from the group consisting of O, S and NQ;
R is selected from the group consisting of hydrogen, aryl containing 6 to 10 carbon atoms and alkyl containing 1 to 6 carbon atoms (either linear or branched);
G is selected from the group consisting of hydrogen, aryl containing from 6 to 10 carbon atoms, alkyl containing 1 to 6 carbon atoms (either linear or branched) and —P⊕D$_3$ X⊖ wherein X is e.g. I⊖, BF$_4$⊖, PF$_6$⊖;
J is aryl containing from 6 to 10 carbon atoms and from zero to two substituents selected from the group consisting of F, Cl, Br, NO$_2$, CN, and alkyl containing 1 to 6 carbon atoms;
Q is aryl containing from 6 to 10 carbon atoms and from zero to two substituents selected from the group consisting of alkyl containing from 1 to 6 carbon atoms, NO$_2$, halogen, CN and CHO;

Provided that when taken toegther R and G is

wherein T is selected from the group consisting of hydrogen, CF$_3$ and CN, and L is selected from the group consisting of aryl containing 6 to 10 carbon atoms and from zero to 2 substituents selected from the group consisting of halogen, CN, CHO and NO$_2$, and alkyl containing from 1 to 6 carbon atoms substituted with from zero to 13 fluorine atoms.

DESCRIPTION OF THE PREFERRED EMBODIMENTS

Representative D organic radicals for the compounds of Formula (III) prepared by the processes of this invention include by way of example and not limitation alkyl such as methyl, ethyl, n-propyl, isopropyl, n-butyl, sec-butyl, isobutyl, tert-butyl, amyl, hexyl, heptyl, octyl, nonyl, decyl, dodecyl, tetradecyl, hexadecyl, octadecyl, and the various homologues and isomers of alkyl having from 1 to 20 carbon atoms; aryl such as phenyl, biphenyl, naphthyl, and the like; aralkyl such as benzyl, phenylethyl, diphenylmethyl, and the like; and alkaryl such as tolyl, ethylphenyl, xylyl, butylphenyl, tert-butylphenyl, trimethylphenyl, diethylphenyl, methylpropylethylphenyl and the ike; haloaryl such as chlorophenyl, bromophenyl, iodophenyl, 2,4-dichlorophenyl, 2,4,6-tribromophenyl, 2,3,4,5,6-pentachlorophenyl and the like; and haloaralkyl such as chlorobenzyl, bromobenzyl, iodobenzyl, chlorophenylethyl, 2,4-dichlorophenylethyl, di(2,4-dichlorophenyl)methyl and the like. Within this class D radicals of not more than 12 carbon atoms containing from 0 to 5 halogen atoms are preferred. Preferably each D is aromatic consisting of phenyl or fused ring aromatic systems.

Representative R organic radicals for the compounds of Formula III prepared by the processes of this invention include by way of example and not limitation alkyl such as methyl, ethyl, n-propyl, isopropyl, n-butyl, sec-butyl, isobutyl, tert-butyl, amyl, iso-amyl, hexyl, iso-hexyl, aryl as phenyl or naphthyl; alkaryl such as tolyl, ethylphenyl, xylyl, trimethylphenyl, diethylphenyl and tert-butylphenyl; and aralkyl such as benzyl or phenylethyl.

Representative G organic radicals include those specifically enumerated in the description of G above plus those exemplified for R in the preceding paragraph.

Representative J organic radicals include but are not limited to naphthyl or phenyl which may contain one or two substituents specifically enumerated in the description of J above plus alkyl such as methyl, ethyl, iso-propyl, n-propyl, n-butyl, iso-butyl, tert-butyl, amyl, iso-amyl, iso-hexyl and hexyl.

Representative Q organic radicals include but are not limited to naphthyl or phenyl which may contain up to two substituents specifically enumerated in the description of Q above plus the alkyl substituents for J described in the preceding paragraph and additionally, chlorine, bromine, fluorine and iodine.

Representative L organic radicals include but are not limited to phenyl or naphthyl which may contain one or two substituents specifically enumerated in the description of L above plus bromine, chlorine, fluorine, iodine and the above exemplified alkyl substituents for J.

Illustrative of the phosphoranylideneketene starting compounds for preparing the compounds of this invention are the following:

$(CH_3)_3P=C=C=O$
$(C_4H_9)_3P=C=C=O$
$(C_6H_5)_3P=C=C=O$
$(CH_3C_6H_4)_3P=C=C=O$
$(C_{10}H_7)_3P=C=C=O$
$(C_6H_{11})_3P=C=C=O$
$(C_{18}H_{37})_3P=C=C=O$
$(C_6H_5CH_2)_3P=C=C=O$
$(CH_3)_3P=C=C=NC_6H_5$
$(C_6H_5)_3P=C=C=NC_6H_5$
$(CH_3)_3P=C=C=S$
$(C_4H_9)_3P=C=C=S$
$(C_6H_5)_3P=C=C=S$
$(CH_3C_6H_4)_3P=C=C=S$
$(C_{10}H_7)_3P=C=C=S$
$(C_6H_{11})_3P=C=C=S$
$(C_{18}H_{37})_3P=C=C=S$
$(C_6H_5CH_2)_3P=C=C=S$
$(C_6H_5)_3P=C=C=NCH_3$
$(C_6H_5)_3P=C=C=NC_6H_4Cl$

The compounds of this invention are readily obtained by reacting at room temperature the phosphoranylideneketenes with aldehydes, active ketones, ketenes and isocyanates as represented by the following equations:

Eq. 2
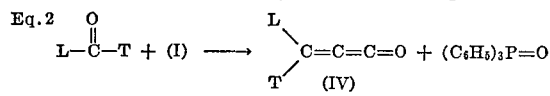

Eq. 3
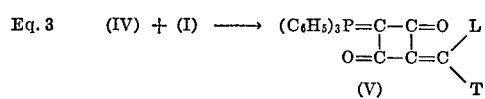

| Compound | L | T |
|---|---|---|
| Va | H | $C_6H_4CN$-p |
| Vb | H | $C_6H_4NO_2$-p |
| Vc | H | $C_6H_4CHO$-p |
| Vd | CN | $C_6H_5$ |
| Ve | $CF_3$ | $CF_3$ |
| Vf | $CF_3$ | $C_6H_4Cl$-p |

When the reactant is

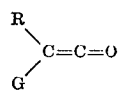

instead of $$L-\underset{\underset{O}{\|}}{C}-T$$

the reaction can be a direct cycloaddition as follows:

Eq. 4
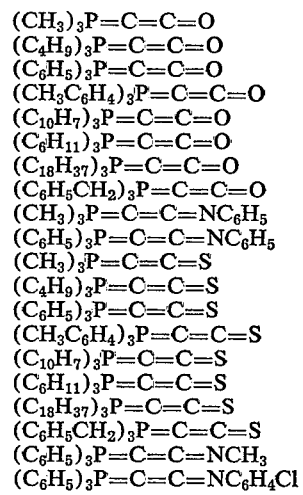

| Compound | R | G |
|---|---|---|
| VIa | H | H |
| VIb | $C_6H_5$ | $C_6H_5$ |

Finally when the reactant is an aryl isocyanate the product contains a heterogeneous ring as shown in Equation 5:

Eq. 5
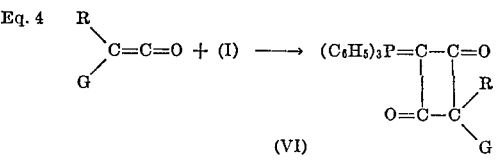

| Compound: | J |
|---|---|
| VIIIa | Phenyl. |
| VIIIb | Tolyl. |
| VIIIc | p-Fluorophenyl. |
| VIIId | p-Cyanophenyl. |
| VIIIe | p-Nitrophenyl. |
| VIIIf | p-Methylthiophenyl. |
| VIIIg | o-Cyanophenyl. |

Aromatic isocyanates react readily with I, but the products isolated have six-membered rings and contain two molecules of the isocyanates for each molecule of I. A single $H^1$ nmr peak for the two tolyl methyl groups of VIII, when J is tolyl, prepared from tolylisocyanate and I, shows that the two tolyl groups have equivalent environments as would be the case for the cyclic structure. The mass spectra of compounds VIIIa to VIIIe contained, in addition to parent ion peaks, ion fragments from loss of one and two isocyanate groups, indicating that there were no skeletal rearrangements during formation of the parent compounds.

Phosphonium salts of the invented compounds I are readily prepared though the mechanism has not been clearly established. Thus reaction of methyl iodide with I gives IXa.

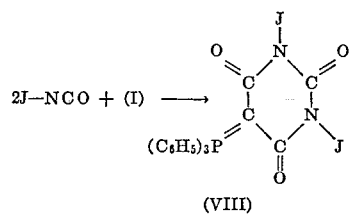

Other useful compounds of this invention are obtained by using an alkyl halide other than methyl iodide. These alkyl halides are of the formula R'X where R' is an alkyl of 1 to 6 carbon atoms that can contain one phenyl group as a substituent and X is I, Cl or Br.

Metathesis of IX with fluoroboric acid and potassium hexafluorophosphate gave the corresponding tetrafluoroborate (IXb) and hexafluorophosphate (IXc). There was no evidence for reaction of IX with excess methyl iodide or fluoroboric acid. The $H^1$ nmr spectrum of IX contained a doublet of doublets for the methyl group at $-1.99$ p.p.m. ($J_{HP}=16.6$ c.p.s.; $J_{HP'}=1.0$ c.p.s.) in the theoretical 1:10 area ratio with respect to the six phenyl groups. The $P^{31}$ nmr spectrum had moderately broad peaks of equal areas at $-25.8$ p.p.m. for the phosphonium substituent and at 0.0 p.p.m. for the phosphorus ylide substituent, the latter $P^{31}$ peak and the infrared spectrum being markedly similar to those of V and VI.

Additional compounds of the invention are prepared from ketenimines with structure (X) analogous to compound I. These ketenimines can be conveniently prepared by thermal cleavage of the mesomeric phosphonium salt obtained by the addition of an aryl isocyanate (QNCO) to hexaphenylcarbodiphosphorane, as shown in the following equation:

Eg. 6  $(C_6H_5)_3P=C=P(C_6H_5)_3 + Q-NCO \longrightarrow$

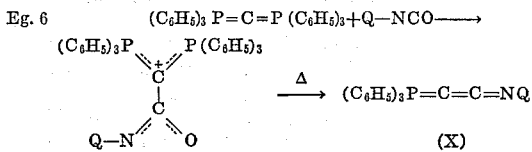

$\xrightarrow{\Delta} (C_6H_5)_3P=C=C=NQ$ (X)

Alternatively, aryl isothiocyanates (QNCS) may be used. Phosphonium salts are readily prepared by treatment of X with alkyl halides (R'X); e.g. XI is obtained from X and methyl iodide.

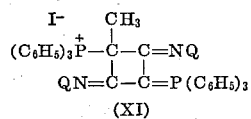

(XI)

Other salts have corresponding structures.
Typical ketenimines include:

| Compound: | Q |
|---|---|
| Xa | Phenyl. |
| Xb | p-Tolyl. |
| Xc | p-Nitrophenyl. |

Thermal cleavage is readily accomplished by heating the mesomeric phosphonium salt to a temperature of at least 50 degrees centigrade and preferably from about 110 to 180 degrees centigrade. The thermal cleavage is advantageously facilitated by carrying out the cleavage reaction in the presence of an inert diluent which has a boiling point above the temperature of the reaction. See the later included list of solvents for suitable diluents. The $P^{31}$ nmr spectrum of XIb (QNCO is p-tolylisocyanate) had moderately broad peaks of equal areas at −28.3 p.p.m. for the phosphonium substituent and at +4.0 p.p.m for the phosphorus ylide; the $H^1$ spectrum had aryl multiplets at −7.0 to −8.4 p.p.m. (30H), a well-resolved four-peak system at −6.18 p.p.m. (8H) with the characteristic $A_2B_2$ pattern of p-disubstituted phenyl groups, a doublet at −2.60 p.p.m. (3M) ($J_{HP}=17$ c.p.s.), and a singlet at −2.02 p.p.m. (6H). The well-resolved four-peak system for the eight ring-bonded tolyl hydrogen atoms and the single peak for the two tolyl methyl groups indicate equivalent environments for the two tolyl groups as would be expected for the cyclic structure.

The new products of this invention are readily prepared by using the reactants in stoichiometric quantities or with a slight excess of the most easily removed reactant. The reactions are suitably carried out at atmospheric pressure although slightly elevated pressures may be employed for a period of about 0.1 to about 40 hours, preferably about 0.5 to 20 hours. One of the advantages of the process of this invention is the extremely modest thermal requirement. Generally the reaction can be carried out at room temperatures although in some cases it is desirable to heat the reaction mixture to reflux temperature of the solvent diluent or not more than 100 degrees centigrade. By the same token temperatures on the order of about 5 degrees centigrade are also useful. It is also desirable to carry out the reaction in the absence of moisture and oxygen, this condition being easily obtained by the use of an inert gas blanket such as nitrogen.

Suitable active ketonic compounds useful in preparing the inventive products of this invention have the formula LC(O)T wherein T is $CF_3$ or CN and include but are not limited to:

hexafluoroacetone
pentafluoroacetone
tetrafluoroacetone
trifluoroacetone
p-chlorophenyltrifluoromethyl ketone
benzoyl cyanide
acetyl cyanide (L is described in column 2, lines 39–44.)

Illustrative of useful aldehydes in the process of this invention include the following:

p-cyanobenzaldehyde
p-nitrobenzaldehyde
terephthaldehyde
acetaldehyde
propionaldehyde
benzaldehyde
butyraldehyde
isobutyraldehyde Among the useful aryl isocyanates (and corresponding isothiocyanates) adaptable to the process of this invention and the new compounds thereof are:

phenylisocyanate
o-chlorophenylisocyanate
p-tolylisocyanate
2,4-dichlorophenylisocyanate
p-fluorophenylisocyanate
p-nitrophenylisocyanate
p-cyanophenylisocyanate
phenylisothiocyanate Suitable inert dispersion media employed in this process include aromatic hydrocarbons and halogen-substituted aromatic hydrocarbons such as benzene, toluene, xylene, and chlorobenzene; alkyl hydrocarbons such as heptane and dodecane; ethers such as dibutyl ether, diethyl ether, and bis(2-methoxyethyl)ether; and low melting solids, e.g. phosphate esters such as tricresyl or triphenyl phosphate.

The new compounds of this invention can be used as pest controlling agents (insecticides); textile auxiliaries; means for soil amelioration; disinfectants (bactericides and fungicides); detergents; additives for petroleum products; means for flameproofing polymers, wood and papers; ion exchangers; fire retardant plasticizers, and the like.

The following examples are illustrative of the invention and unless otherwise specified all parts are by weight and all temperatures are expressed as degrees centigrade.

Melting points were obtained in a Thomas-Hoover Unimelt instrument and are corrected. Infrared spectra were determined in potassium bromide disks (unless otherwise noted) on a Beckman IR–4 spectrophotometer. Proton nuclear magnetic resonance (nmr) spectra were obtained at 60.0 or 100.0 mc. on Varian A–60 or HR–100 spectrometers with tetramethylsilane as an internal standard. Phosphorus nmr spectra were determined at 24.3 or 40.5 mc. on Varian HR–60 or HR–100 instruments and are reported with respect to 85% $H_3PO_4$ contained in a capillary. Fluorine nmr spectra were measured at 56.4 mc. on a Varian A–56/60 instrument and are reported with respect to trichlorofluoromethane. The nmr measurements were generally made on saturated solutions. Mass spectra were obtained on a Consolidated Engineering Corporation Type 21–104 spectrometer fitted with a probe for direct introduction of solids.

PREPARATION OF TRIPHENYLPHOSPHORAN-YLIDENEKETENE (COMPOUND I)

Hexaphenylcarbodiphosphorane (16.0 g., 0.03 mole) and dry diglyme (50 g.) were stirred under $N_2$ in a 100 ml. flask as gaseous CO₂ was introduced below the surface at room temperature. A white solid formed as the yellow color gradually disappeared. After 1.5 hrs. the temperature was raised to 65°. Carbon dioxide addition was then stopped and the reaction mixture allowed to cool under N₂. Filtration under N₂, washing with diglyme and then with ethyl ether, and drying under N₂ gave 17.2 g. (96.5% yield) of white powder, M.P. 140–141°

*Analysis.*—Calcd. for $C_{38}H_{30}O_2P_2$ (percent): C, 78.60; H, 5.22; P, 10.68. Found (percent): C, 78.58; H, 5.36; P, 10.51.

A mixture of the hexaphenylcarbodiphosphorane-carbon dioxide adduct (15.8 g.) and dry diglyme (30 g.) was stirred under N₂ and warmed at 140–145° for 0.25 hr., giving a clear yellow solution having $P^{31}$ nmr signals at —23.4 and —3.6 p.p.m. (an authentic sample of triphenylphosphine oxide had a $P^{31}$ signal at —24.0 p.p.m. in diglyme). The reaction mixture was cooled for four hours to induce crystallization, filtered under N₂ and the product washed with diglyme and with ether to give 6.3 g. of white powder, M.P. 130–160°, having strong infrared bands at 4.74 and 3.38μ. Repeated recrystallization from diglyme resulted in diminishing infrared absorption at 8.38μ (P=O) and higher melting points. After five recrystallizations, 1.6 g. (19.5% yield) of white needles, I was obtained, M.P. 172–173.5°, having essentially no infrared absorption at 8.38μ but a very strong band at 4.74μ. The $P^{31}$ nmr spectrum showed a signal at —2.6 p.p.m. (in benzene at 40.5 mc.); molecular weight in CHCl₃, 298 (calcd.: 302.3). The mass spectrum had peaks at 302[M⁺], 301[M—H], 278[$(C_6H_5)_3P$=O]

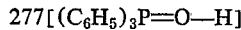
277[$(C_6H_5)_3$P=O—H]

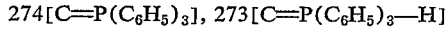
274[C=P$(C_6H_5)_3$], 273[C=P$(C_6H_5)_3$—H]

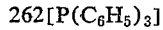
262[P$(C_6H_5)_3$]

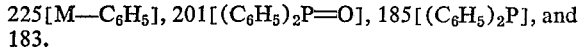
225[M—$C_6H_5$], 201[$(C_6H_5)_2$P=O], 185[$(C_6H_5)_2$P], and 183.

*Analysis.*—Calcd. for $C_{20}H_{15}OP$ (percent): C, 79.44; H, 5.00; P, 10.24. Found (percent): C, 79.51; H, 4.93; P, 10.20.

An additional 1.1 g. of slightly less pure product was isolated from the filtrates. Concentration of the combined filtrates to dryness, extraction of the residue with hot heptane, and repeated recrystallization of the heptane soluble material gave 5.3 g. of a white solid, M.P. 156–157°, having a $P^{31}$ nmr signal at —29.1 p.p.m. in CDCl₃ (an authentic sample of triphenylphosphine oxide melted at 156–158° and had a $P^{31}$ signal at —28.5 p.p.m.). The infrared spectrum contained no band at 4.74μ and was identical to that of an authentic sample of triphenylphosphine oxide.

Infrared spectra of the various recrystallization mixtures and filtrate residues contained only bands that are characteristic of the two isolated compounds, indicating that these are the only two products produced in significant quantities under the decomposition conditions used. It was frequently found convenient to use the crude reaction solution in the preparation of derivatives of I.

Preparation of triphenylphosphoranylidenethioketene the sulfur analog of I: A solution of a mixture (1.3 g.) of I and triphenylphosphine oxide in benzene (15 ml.) and carbon disulfide (0.5 g.) was stirred for 40 hrs. at room temperature. A solid that separated during this time was recrystallized from benzene, yielding 0.5 g. of tan crystals, M.P. 224–226° (no M.P. depression with an authentic sample of triphenylphosphoranylidenethioketene). The $P^{31}$ nmr and infrared spectra were also essentially identical to those of triphenylphosphoranylidenethioketene [see C. N. Matthews et al.; Tetrahedron Letters, 5707 (1966)].

*Analysis.*—Calcd. for $C_{20}H_{15}PS$ (percent): C, 75.43; H, 4.75; P, 9.73; S, 10.07. Found (percent): C, 75.25; H, 4.71; P, 9.70; S, 10.10.

EXAMPLE 1

2-(p-cyanobenzylidene)-4-(triphenylphosphoranyl-idene)-1,3-cyclobutanedione (Compound Va)

A 3.0 g. (0.01 mole) portion of I prepared as above and 0.7 g. (0.005 mole) of p-cyanobenzaldehyde were stirred in 10 g. of benzene under N₂. The initially insoluble I gradually dissolved as the color of the reaction mixture changed from light yellow to orange, and another solid separated after about 1 hour. Stirring was continued at room temperature for 20 hours. Filtration under N₂ and washing with benzene and ether gave 1.8 g. (78% yield) of light yellow solid (Va), M.P. 248–250° (M.P. unchanged after recrystallization from benzene-acetonitrile). Triphenylphosphine oxide, 1.2 g. (86% yield), having $P^{31}$ nmr and infrared spectra identical to an authentic sample was isolated from the filtrate. The $P^{31}$ nmr spectrum of Va had a peak at 0.0 p.p.m. (in CDCl₃); the $H^1$ spectrum contained aryl multiplets at —7.2 to —8.3 p.p.m. and a singlet at —6.46 p.p.m., the areas approximating the theoretical 19:1 ratio. The infrared spectrum had bands at 4.49(w.), 5.70(w.), 6.11(s.), and 7.7–7.8μ(s.). Molecular weight in acetone, 467 (calcd.: 457.4) The mass spectrum had peaks at 457[M⁺], 428[M—(CO+)],

401[M—2CO],

388[M—(2CO+C+H)], 355[M—$C_6H_4CN$]

329[M—[C=CH$C_6H_4$CN+H]

302[$(C_6H_5)_3$P=C=C=O]; and 301

*Analysis.*—Calcd. for $C_{30}H_{20}NO_2P$ (percent): C, 78.73; H, 4.40; N, 3.06; P, 6.77. Found (percent): C, 78.55; H, 4.52; N, 3.04; P, 6.93.

The $P^{31}$ nmr spectrum of Va in concentrated trifluoroacetic acid had a peak at —3.4 p.p.m.; the $H^1$ spectrum had an aryl multiplet at —7.58 to —8.33 p.p.m. and a singlet at —6.91 p.p.m. Evaporation of the trifluoroacetic acid left a light yellow solid having an infrared spectrum essentially identical with that of the starting material Va.

EXAMPLE 2

2 - (p - nitrobenzylidene)-4-(triphenylphosphoranyl-idene)-1,3-cyclobutanedione (Compound Vb)

A 2.2 g. portion of a 4:1 mixture of I and triphenyl-phosphine oxide was stirred in benzene under N₂ as 1.5 g. of p-nitrobenzaldehyde was added. The mixture was warmed to reflux, cooled at 5° overnight, and filtered under N₂ to give a yellow-brown solid which was recrystallized twice from benzene-acetonitrile to give 0.7 g. of yellow solid (Vb), M.P. 258–259°. The $P^{31}$ nmr spectrum had a singlet at —1.2 p.p.m. (in CDCl₃); the $H^1$ spectrum contained an aryl singlet at —8.26 p.p.m., an aryl multiplet at —7.4 to —8.1 p.p.m., and a singlet at —6.53 p.p.m., the areas approximating a 4:15:1 ratio. The infrared spectrum had bands at 5.68(w.), 6.08(s.), 7.43(s.), and 7.7–7.8μ(s.). Molecular weight in CHCl₃, 463 (calcd.: 477.4).

*Analysis.*—Calcd. for $C_{29}H_{20}NO_4P$ (percent): C, 72.94; H, 4.22; N, 2.93; P, 6.49. Found (percent): 72.76; H, 4.26; N, 2.81; P, 6.50.

Compound Vb was recovered unchanged after stirring at room temperature for 2 days in diglyme containing water, after treatment with aniline in boiling benzene, and after a dispersion in methanol acidified with sulfuric acid was warmed at reflux for 2 hours.

EXAMPLE 3

2 - (p - formylbenzylidene)-4-(triphenylphosphoranyl-idene)-1,3-cyclobutanedione (Compound Vc)

A mixture of triphenylphosphine oxide and about 2.0 g. of I in diglyme was stirred under N₂ as 0.7 g. of terephthalaldehyde was added. After 20 hours the reaction mixture was diluted with ether, causing 0.9 g. of yellow solid to precipitate. Recrystallization from acetonitrile-chloroform gave 0.4 g. of yellow crystals, M.P. 265–268°. The $H^1$ nmr spectrum (in $CDCl_3$) had singlets at −9.98 and −6.53 p.p.m. and aryl multiplets at −7.25 to −8.33 p.p.m., the areas approximating the theoretical 1:1:19 ratio. The infrared spectrum had bands at 5.72(w.), 5.91(m.), 6.12(s.), and 7.76μ(s.). Molecular weight in acetone, 449 (calcd.: 460.4). The mass spectrum had peaks at 460[M+], 432[M—CO], 404[M—2CO], $$392[M—(2CO+C)]$$

329[M—(C=CHC_6H_4CHO+H)]

$$302[(C_6H_5)_3P=C=C=O]$$

and 301.

*Analysis.*—Calcd. for $C_{30}H_{21}O_3P$ (percent): C, 78.23; H, 4.60; P, 6.72. Found (percent): C, 77.30; H, 4.69; P, 6.83.

EXAMPLE 4

2 - [(cyano)(phenyl)methylene]-4-(triphenylphosphoranylidene)-1,3-cyclobutane (Compound Vd)

A 1.0 g. portion of I and 0.3 g. of benzoyl cyanide were stirred in benzene under $N_2$ at room temperature. The initially insoluble I gradually dissolved and another solid separated on further stirring. Recrystallization from benzene-acetonitrile gave 0.4 g. of off-white solid (Vd), M.P. 227–229°, having infrared bands at 4.51(w.), 5.68(w.), 6.07(s), and 7.78μ(s.). Molecular weight in acetone, 470 (calcd.: 457.4). The mass spectrum had peaks at 457[M+], 430[M—(CN+H)], 429[M—CO], 401[M—2CO], 389[M—2CO+C], 380[M—C_6H_5], $$329[M—(C=CCNC_6H_5+H)]$$

302[(C_6H_5)_3P=C=C=O], and 301.

*Analysis.*—Calcd. for $C_{30}H_{20}NO_2P$ (percent): C, 78.73; H, 4.40; N, 306; P, 6.77. Found (percent): C, 78.77; H, 4.54; N, 2.94; P, 6.50.

EXAMPLE 5

2-[bis(trifluoromethyl)methylene]-4-(triphenylphosphoranylidene)-1,3-cyclobutanedione (Compound Ve)

A suspension of 1.2 g. of I in 7 g. of benzene was stirred under $N_2$ as gaseous hexafluoroacetone was dispersed over the surface. The solid I gradually dissolved as the treatment with hexafluoroacetone was continued for 0.5 hour. Evaporation of the solvent gave a solid mixture having $P^{31}$ nmr peaks of approximately equal areas at −24.9 p.p.m. for triphenylphosphine oxide and at −1.9 p.p.m. for Ve (in benzene); and the $F^{19}$ spectrum had a doublet at +57.1 p.p.m., $J_{FP}$=1.1 c.p.s. The infrared spectrum in benzene had bands at 5.63(w.), 6.01(s.), 7.47(s.), 8.04(s.), 8.32(m.), and 8.60μ(s.). The mass spectrum of the mixture had peaks at 492[M+ of 4e], 473[M—F], 463[M—(CO+H)], 436[M—2CO], $$435[M—(2CO+H)]$$

424[M—(2CO+C)], 423[M—CF_3], $$395[M—(CF_3+CO)]$$

367[M—(CF_3+2CO)], 355[M—(2CF_3—H)], $$329[M—(C=C(CF_3)_2+H)]$$

302[(C_6H_5)_3P=C=C=O], 301, and 278[M+ of $$(C_6H_5)_3P=O]$$

EXAMPLE 6

2 - [(p - chlorophenyl)(trifluoromethyl)methylene]-4-(triphenylphosphoranylidene)-1,3-cyclobutanedione (Compound Vf)

A 0.5 g. portion of I and 0.3 of p-chlorophenyltrifluoromethyl ketone were stirred in benzene under $N_2$ for several hours, and the reaction mixture was evaporated to dryness. The residue was recrystallized from benzene, yielding 0.2 g. of white solid (Vb), M.P. 246–247°. The $P^{31}$ nmr spectrum (in $CDCl_3$) had a moderately broad peak at −1.9 p.p.m.; and the $F^{19}$ spectrum had a peak at +57.8 p.p.m. The infrared spectrum had bands at 5.67 (w.), 6.07(s.), and 7.75μ(s.). Molecular weight in benzene, 542 (calcd: 534.9). The mass spectrum had peaks at 534[M+], 515[M—F], 505[M—(CO+H)]

$$478[M—2CO]$$

466[M—(2CO+C)], 465[M—CF_3], $$329[M—(C=CCF_3C_6H_4Cl+H]$$

302[(C_6H_5)_3P=C=C=O], and 301

*Analysis.*—Calcd. for $C_{30}H_{19}ClF_3O_2P$ (percent): C, 67.35; H, 3.58; Cl, 6.63; P, 5.79. Found (percent): C, 66.95; H, 3.52; Cl, 7.17; P, 5.96.

EXAMPLE 7

2-triphenylphosphoranylidene-1,3-cyclobutanedione (Compound VIa)

A dispersion of 1.5 g. of I in 15 g. of benzene was stirred under $N_2$ and treated with ketene generated from acetone by the method of Williams and Hurd, J. Org. Chem., vol. 4, 122 (1939). Undissolved I gradually disappeared, and after a few minutes another solid separated. Ketene treatment was continued for 0.1 hour more, and the reaction mixture was filtered under $N_2$ and washed with benzene and ether to give 1.1 g. of crude VIa. Recrystallization twice from benzene-acetonitrile gave 0.7 g. of white crystals, M.P. 219–221° dec. It had a $P^{31}$ nmr chemical shift at +4.4 p.p.m. (in $CDCl_3$), and an $H^1$ nmr doublet at −3.48 p.p.m., $J_{HP}$=3.1 c.p.s., in a 2:15 area ratio with an aryl multiplet at −7.33 to −8.08 p.p.m. The infrared spectrum had bands at 5.67μ(m), 5.77μ(m), 6.12μ(s.) and 7.6–7.7μ(s.). Molecular weight in $CHCl_3$, 340 (calcd: 344.3).

The mass spectrum had peaks at 344[M+], $$330[M—CH_2]$$

329[M—(CH_2+H)], 316[M—CO], $$302[(C_6H_5)_3P=C=C=O]$$

301, and 287[M—(2CO+H)]; in some samples a small peak was observed at 368[M+2C].

*Analysis.*—Calcd. for $C_{22}H_{17}O_2P$ (percent): C, 76.71; H, 4.97; P, 8.99. Found (percent): C, 76.45; H, 5.04; P, 9.03.

EXAMPLE 8

2,2-diphenyl-4-triphenylphosphoranylidene 1,3-cyclobutanedione (Compound VIb)

A dispersion of 1.5 g. of I in benzene was stirred under $N_2$ as 1.0 g. of diphenylketene was added dropwise. Stirring was continued for 1 hour, and the reaction mixture was filtered, yielding 2.3 g. of white solid. Recrystallization of a 1.4 g. portion from benzene gave 1.1 g. of white crystals (VIb), M.P. 207–208°. The $P^{31}$ nmr spectrum (in $CDCl_3$) had a singlet at +3.4 p.p.m. (~0 p.p.m. in trifluoroacetic acid). The infrared spectrum contained bands at 5.71(m.), 6.11(s.), and 7.7μ(s.). Molecular weight in $CHCl_3$, 510 (calcd: 496). The mass spectrum had peaks at 496[M+], 467[M—(CO+H)], 452[M—CO_2], $$439[M—(2CO+H)]$$

438[M—(2CO+2H)], 391[M—(C_6H_5+CO)], $$364[M—(C_6H_5+2CO—H)]$$

332[M—(C(C_6H_5)_2—2H)], 302[(C_6H_5)_3P=C=C=O], 301, 194[(C_6H_5)_2C=C=O], and 165[C(C_6H_5)_2—H].

*Analysis.*—Calcd. for $C_{34}H_{25}O_2P$ (percent): C, 82.21; H, 5.07; P, 6.24. Found (percent): C, 81.91; H, 5.13; P, 6.18.

Compound VIb was recovered unchanged from concentrated trifluoroacetic acid as shown by nmr spectra ($P^{31}$ and $H^1$ in $CDCl_3$) and by infrared spectra. Likewise, VIb was recovered unchanged after a warm solution in equal volumes of methanol and chloroform was acidified with trifluoroacetic acid.

EXAMPLE 9

2,4-dioxo-1-methyl-3-triphenylphosphoranylidene-1-cyclobutyltriphenylphosphonium iodide (Compound IXa)

A methylene chloride solution of a mixture (2.0 g.) of I and triphenylphosphine oxide was stirred under nitrogen as methyl iodide (3.0 g.) was added. Stirring was continued for 2 hours, when the solvent and excess methyl iodide were evaporated. The residue was washed with benzene and ether to give 2.0 g. of white powder. Recrystallization from diglyme-acetonitrile gave 1.1 g. IXa, M.P. 241–242° (dec.). The $P^{31}$ nmr spectrum (in $CDCl_3$) contained moderately broad peaks of equal areas at −25.8 and 0.0 p.p.m. (at −26.2 and 0.0 p.p.m. in $CF_3CO_2H$). The $H^1$ spectrum contained aryl multiplets at −7.0 to −8.2 p.p.m. and a doublet of doublets at −1.99 p.p.m. ($J_{HP}$=16.6 c.p.s.; $J_{HP}$=1.0 c.p.s.), the areas of aryl multiplets to primary doublet having the ratio 10:1. The infrared spectrum contained absorption bands at 5.66μ(m.), 6.05μ(s.) and 7.69μ(s.).

*Analysis.*—Calcd. for $C_{41}H_{33}IO_2P_2$ (percent): C, 65.94; H, 4.45; I, 16.99; P, 8.30. Found (percent): C, 65.85; H, 4.42; I, 17.10; P, 8.29.

EXAMPLE 10

Tetrafluoroborate salt of IXa (Compound IXb)

A solution of IXa (0.7 g.) in methanol was stirred as excess 48% fluoroboric acid was added dropwise, causing a white solid to separate rapidly. The reaction mixture was warmed to reflux and filtered to give 0.5 g. of white powder, IXb, M.P. 241–242° (dec.). The $H^1$ nmr spectrum (in $CDCl_3$) contained aryl multiplets at −7.1 to −8.2 p.p.m. and a doublet of doublets at −1.96 p.p.m. ($J_{HP}$=16.6 c./s.; $J_{HP}$=1.0 c./s.), the area ratio of aryl multiplets to primary doublet being approximately 10:1. The infrared spectrum contained bands at 5.66μ(m.), 6.08μ(s.), 7.6–7.7μ(s.) and 9.4μ(v.s.).

*Analysis.*—Calcd. for $C_{41}H_{33}BF_4O_2P_2$ (percent): C, 69.68; H, 4.71; B, 1.53; F, 10.75; P, 8.77. Found (percent): C, 69.39; H, 4.72; B, 1.55; F, 10.77; P, 8.85.

EXAMPLE 11

Hexafluorophosphate salt of IXa (Compound IXc)

A solution of IXa (0.4 g.) in methanol was stirred as $KPF_6$ (0.2 g.) was added. A white solid separated rapidly. The mixture was warmed to reflux and filtered hot, and the product was washed several times with warm methanol, yielding 0.3 g. of white solid, IXc, M.P. 238–239° (dec.).

*Analysis.*—Calcd. for $C_{41}H_{33}F_6O_2P_3$ (percent): C, 64.38; H, 4.35; F, 14.90; P, 12.15. Found (percent): C, 63.90; H, 4.48; F, 14.94; P, 12.21.

EXAMPLE 12

1,3-diphenyl-2,4,6-trioxo-5-triphenylphosphoranylidene-1,3-diazacyclohexane (Compound VIIIa)

A dispersion of I (1.2 g.) in benzene was stirred under nitrogen as phenylisocyanate (0.5 g.) was added dropwise. A red color developed and a solid separated while stirring was continued for 1 hour. Filtration and recrystallization of the solid from diglyme-acetonitrile gave 0.5 g. of white solid VIIIa, M.P. 350–352°, having a $P^{31}$ nmr singlet at −17.1 p.p.m. and $H^1$ aryl multiplets from −7.1 to −8.0 p.p.m. The infrared spectrum contained bands at 5.83μ(m.), 6.12μ(s.), 7.01μ(m.), and 7.34μ(s.). The mass spectrum had peaks at 540[M+], 421[M—$C_6H_5NCO$], 372[M—($C_6H_5$+$C_6H_6N$)], 302[$(C_6H_5)_3P$=C=C=O], and 301.

*Analysis.*—Calcd. for $C_{34}H_{25}N_2O_3P$ (percent): C, 75.51; H, 4.66; N, 5.18; P, 5.73. Found (percent): C, 75.47; H, 4.73; N, 5.35; P, 5.84.

EXAMPLE 13

1,3-di(p-tolyl)-2,4,6-trioxo-5-triphenylphosphoranylidene-1,3-diazacyclohexane (Compound VIIIb)

Thirty ml. of a diglyme solution of I and triphenylphosphine oxide was stirred under nitrogen at room temperature as p-tolylisocyanate (3 ml.) was added. Stirring was continued for 20 hours, and then ether was added, causing 0.8 g. of yellow solid to separate. Recrystallization from diglyme-acetonitrile yielded 0.3 g. of light yellow solid, VIIIb, M.P. 315–317°, having a $P^{31}$ nmr singlet at −17.4 p.p.m. (in $CDCl_3$) and an $H^1$ singlet at −2.23 p.p.m. and aryl multiplet at −7.1 to −8.0 p.p.m., the areas being in the theoretical 6:23 ratio. The infrared spectrum contained absorption bands at 5.82(m.), 6.12(s.), 7.01 (m.), and 7.36μ(s.). Molecular weight in $CHCl_3$, 557 (theory, 568). The mass spectrum had peaks at 568[M+], 435[M—$CH_3C_6H_4HCO$], $$372[M—(CH_3C_6H_4+CH_3C_6H_4N)]$$

$302[(C_6H_5)_3P$=C=C=O], and 301.

*Analysis.*—Calcd. for $C_{36}H_{29}N_2O_3P$ (percent): C, 76.02; H, 5.14; N, 4.93; P, 5.45. Found (percent): C, 76.06; H, 5.32; N, 4.97; P, 5.51.

EXAMPLE 14

1,3-di(p-fluorophenyl)-2,4,6-trioxo-5-triphenylphosphoranylidene-1,3-diazacyclohexane (Compound VIIIc)

Twenty ml. of a diglyme solution of I and triphenylphosphine oxide was stirred under nitrogen as p-fluorophenylisocyanate (1 ml.) was added. Stirring was continued for 2 hours, when the reaction mixture was diluted with ether and cooled at 5° for 5 hours. Filtration gave a white solid which was recrystallized by precipitation of a diglyme-acetonitrile solution with ether to give 0.4 g. of white powder, VIIIc, M.P. 296–299°, having a $P^{31}$ nmr singlet at −17.6 p.p.m. (in $CDCl_3$). The $F^{19}$ spectrum contained a complex multiplet centered at +114.3 p.p.m., and the $H^1$ spectrum had complex multiplets from −6.8 to −7.9 p.p.m. The infrared spectrum had absorption bands at 6.12μ(s.), 5.81μ(m.), 6.99μ(m.), and 7.36μ(s.). Molecular weight in acetone, 570 (theory, 576). The mass spectrum had peaks at 576[M+], $$439[M—FC_6H_4NCO], 372[M—(FC_6H_4+FC_6H_4N)]$$

302[M—2$FC_6H_4NCO$], and 301.

*Analysis.*—Calcd. for $C_{34}H_{23}F_2O_3P$ (percent): C, 70.81; H, 4.02; F, 6.59; N, 4.86; P, 5.37. Found (percent): C, 70.22; H, 3.90; F, 6.52; N, 4.77; P, 5.40.

EXAMPLE 15

1,3 - di(p-cyanophenyl)-2,4,6-trioxo-5-triphenylphosphoranylidene-1,3-diazacyclohexane (Compound VIIId)

Thirty ml. of a diglyme solution of I and triphenylphosphine oxide was stirred under nitrogen as p-cyanophenylisocyanate (1.0 g.) was added in portions. After 1 hour the reaction mixture was diluted with ether and filtered. Recrystallization of the solid product from diglyme-acetonitrile gave 1.0 g. of white solid, VIIId, M.P. 325–327°. The $P^{31}$ nmr spectrum consisted of a singlet at −18.1 p.p.m. (in $CDCl_3$), and the $H^1$ spectrum consisted of complex aryl multiplets from −7.0 to −8.3 p.p.m. The infrared spectrum had absorption bands at 4.47μ(w.), 5.82μ(m.), 6.13μ(s.), 6.99(m.), and 7.36μ (s.). Molecular weight in $CHCl_3$, 592 (theory, 590). The mass spectrum had peaks at 590[M+], $$446[M—NCC_6H_4NCO]$$

$$372[M—(NCC_6H_4+NCC_6H_4N)]$$

302[M—2$NCC_6H_4NCO$], and 301.

*Analysis.*—Calcd. of $C_{36}H_{23}N_4O_3P$ (percent): C, 73.20; H, 3.93; N, 9.49; P, 5.24. Found (percent): C, 72.96; H, 4.08; N, 9.28; P, 5.24.

EXAMPLE 16

1,3-bis(p-nitrophenyl)-2,4,6-trioxo-5-triphenylphosphoranylidene-1,3-diazacyclohexane (Compound VIIIe)

A solution of 2.2 g. of I and 2.5 g. of p-nitrophenylisocyanate in 25 ml. of benzene was warmed to reflux under $N_2$. Filtration of the reaction mixture after cooling to room temperature and then recrystallization of the solid product from benzeneacetonitrile gave 3.1 g. of yellow powder (VIIIe), M.P. 330–332°. It had a $P^{31}$ nmr peak at −17.6 p.p.m. (in $CDCl_3$). The $H^1$ nmr spectrum had peaks at −8.38 and −8.21 p.p.m. which appeared to represent the left half of an $A_2B_2$ pattern for the two p-disubstituted phenyl groups, the right half apparently being masked in an aryl multiplet at −8.08 to −7.33 p.p.m. The infrared spectrum had bands at 5.82(w.), 6.12(s.), 6.52(m.), 6.98(m.), and 7.39μ(s.). Molecular weight in $CHCl_3$, 628 (calcd.: 630.5).

*Analysis.*—Calcd. for $C_{34}H_{23}N_4O_7P$ (percent): C, 64.73; H, 3.67; N, 8.88; P, 4.91. Found (percent): C, 64.39; H, 3.75; N, 8.84; P, 5.06.

The corresponding sulfur analog of compounds V, VI, and VIII are formed when triphenylphosphoranylidenethioketene is substituted for a like molar amount of triphenylphosphoranylideneketene.

EXAMPLE 17

A ½ x 4 inch strip of cotton cloth was padded with a 20% chloroform solution of 1,3-di(p-fluorophenyl)-2,4,6-trioxo - 5 - triphenylphosphoranylidene - 1,3 - diazacyclohexane (VIIIc) and then dried to constant weight. The weight increase was 28.3%. When held in an open flame, the dried, treated cloth did not support combustion and the length of charring was less than 1.0 inch, i.e. well within the limits set forth by the textile flameproofing test D626–55T of the American Society for Testing Materials. The hand of the treated cloth was smooth and nonharsh and its color had not been affected by the treatment. Treatment of the cloth with chloroform, alone, resulted in readily ignitable, highly flammable material.

EXAMPLE 18

A ½ x 4 inch strip of Whatman No. 1 filter paper was padded with a 10% solution of 2,4-dioxo-1-methyl-3-triphenylphosphoranylidene - 1 - cyclobutyltriphenylphosphonium iodide (IXa) and then dried to constant weight at 100° C. The weight increase of the treated paper was 22.4%. When held in an open flame, the dried, treated paper did not support combustion, and the length of charring was less than two inches, well within the limits set forth by the paper flameproofing test D777–46 of the American Society for Testing Materials. Treatment of the paper with chloroform alone, resulted in readily ignitable, highly flammable material.

EXAMPLE 19

[1 - methyl - 2,4 - bis(phenylimino) - 3 - (triphenylphosphoranylidene)cyclobutyl]triphenylphosphonium iodide (Compound XIa)

A mixture of 21.4 g. (0.04 mole) of hexaphenylcarbodiphosphorane and 110 g. of diglyme was stirred under $N_2$ as 8.0 g. (0.06 mole) of phenylisothiocyanate was added dropwise. The reaction mixture was warmed at 50–60° for 1 hour, cooled, filtered, and the solid product was washed with diglyme and ether and dried at 60°/0.1 mm. to give 25.9 g. (96.5% yield) of light yellow powder, M.P. 204–205° dec. A freshly prepared solution in $CH_2Cl_2$ showed at $P^{31}$ nmr singlet at −12.1 p.p.m. The infrared spectrum had bands at 6.67μ(s.) and 8.83μ(s.). Molecular weight in $CHCl_3$, 669 (theoretical, 671.7).

*Analysis.*—Calcd. for $C_{44}H_{35}NP_2S$ (percent): C, 78.64; H, 5.25; N, 2.08; P, 9.22; S, 4.77. Found (percent): C, 78.43; H, 5.29; N, 2.09; P, 9.32; S, 5.03.

A mixture of 5.0 g. of the hexaphenylcarbodiphosphoranephenylisothiocyanate adduct prepared above and 10 g. of o-dichlorobenzene was stirred and warmed under $N_2$ to a maximum temperature of 178°. After 2 minutes at 177–178° the reaction mixture containing Xa was cooled, giving a dark red solution having a very strong infrared absorption band at 5.0μ. The $P^{31}$ nmr spectrum of this solution contained singlets at −42.9 p.p.m. and at −2.4 p.p.m. in approximately a 3:2 area ratio.

The crude reaction mixture containing Xa was stirred under $N_2$ as 1.0 g. of methyl iodide was added dropwise. After being stirred for 20 hours at room temperature, the reaction mixture was diluted with 20 ml. of benzene and then filtered to give 2.8 g. of light yellow solid. Recrystallization from benzeneacetonitrile gave 1.7 g. (51% yield) of light yellow solid (XIa), M.P. 199–201° dec. An analytical sample was recrystallized twice from acetonitrile to give a white solid, M.P. 199–201° dec. The $P^{31}$ nmr spectrum (in $CDCl_3$) contained moderately broad singlets of equal areas at −28.1 and +4.4 p.p.m.; the $H^1$ spectrum contained aryl multiplets at −8.3 to −7.0 p.p.m. (30H), at −6.7 to −6.3 p.p.m. (6H), and at −6.3 to −5.9 p.p.m. (4H) and an alkyl doublet at −2.56 p.p.m. (3H), $J_{HP}$ 17 c./s. The infrared spectrum had bands at 5.88μ(w.), 6.18μ(s.), 6.31μ(s.), and 7.85μ(s.).

*Analysis.*—Calcd. for $C_{53}H_{43}IN_2P_2$ (percent): C, 70.98; H, 4.83; I, 14.15; N, 3.12; P, 6.91. Found (percent): C, 70.22; H, 4.90; I, 13.93; N, 3.20; P, 6.77; S, 0.00.

EXAMPLE 20

[1-methyl - 2,4 - bis(p-methylphenylimino) - 3 - (triphenylphosphoranylidene)cyclobutyl]triphenylphosphonium iodide (Compound XIb)

A suspension of 16.1 g. (0.03 mole) of hexaphenylcarbodiphosphorane in 75 g. of diglyme was stirred under $N_2$ as 5.3 g. (0.04 mole) of p-tolylisocyanate was added dropwise. The reaction mixture was warmed at 50–60° for 1 hour, filtered under $N_2$ while warm, and the solid product was washed with diglyme and ether and then dried at 100°/0.1 mm. to give 19.0 g. (94.7% yield) of yellow powder, M.P. 174–176° dec. The $P^{31}$ nmr spectrum (in $CH_2Cl_2$) had a singlet at −9.7 p.p.m. (no change after 24 hours); the $H^1$ spectrum had aryl multiplets centered at −7.62 p.p.m. (30H) and at −6.66 p.p.m. (4H) and an alkyl singlet at −2.02 p.p.m. (3H). The infrared spectrum had bands at 6.6μ(s.) and 7.5μ(s.). Molecular weight in $CHCl_3$, 661 (theoretical, 669.7).

*Analysis.*—Calcd. for $C_{45}H_{37}NOP_2$ (percent): C, 80.70; H, 5.57; N, 2.09; P, 9.25. Found (percent): C, 80.15; H, 5.67; N, 2.06; P, 9.16.

A mixture of 5.0 g. of the p-tolylisocyanate-hexaphenylcarbodiphosphorane adduct prepared above and 10 g. of o-dichlorobenzene was stirred and warmed to 165°. The resulting dark red-brown solution had poorly resolved $P^{31}$ nmr peaks at approximately −25.3, −3.0, and +7.8 p.p.m.; the infrared spectrum had bands at 4.77μ(m.) and 5.00μ(m.) Xb. Methyl iodide (1 g.) was added to the dark solution, and the reaction mixture was stirred at room temperature for 20 hours and then filtered to give 0.4 g. of light tan solid (XIb). An analytical sample was recrystallized from benzene-acetonitrile to give light yellow crystals, M.P. 204–207° (red melt). The $P^{31}$ nmr spectrum (in $CDCl_3$) had moderately broad peaks of equal areas at −28.3 and +4.0 p.p.m.; the $H^1$ spectrum had complex aryl multiplets at −7.0 to −8.4 p.p.m. (30H), a well-resolved four-peak system centered at −6.18 p.p.m. (8H) with the $A_2B_2$ pattern characteristic of p-disubstituted phenyl systems, a doublet at −2.60 p.p.m. (3H) ($J_{CH_3-P}$ 17 c./s.), and a singlet at −2.02 p.p.m. (6H). The infrared spectrum had bands at 5.9μ(w.), 6.28μ(s.), and 7.87μ(m.).

*Analysis.*—Calcd. for $C_{55}H_{47}IN_2P_2$ (percent): C, 71.41; H, 5.12; I, 13.72; N, 3.03; P, 6.70. Found (percent): C, 71.29; H, 4.87; I, 13.72; N, 3.25; P, 6.51.

EXAMPLE 21

[1 - methyl - 2,4 - bis(p-nitrophenylimino) - 3 - (triphenylphosphoranylidene)cyclobutyl]triphenylphosphonium iodide (Compound XIc)

A dispersion of 10.8 g. (0.02 mole) of hexaphenylcarbodiphosphorane in 50 g. of diglyme was stirred as 6.0 g. (0.033 mole) of p-nitrophenylisothiocyanate was added in portions under $N_2$. A red color developed immediately. The reaction mixture was stirred for 0.5 hour at room temperature and then filtered to give 13.7 g. (95.7%) of brick red powder, M.P. 229–230° dec. The infrared spectrum had bands at 6.7μ(m.), 7.15μ(m.),7.7–7.8μ(s.), and 8.6μ(s.). The red solid was too insoluble in the following solvents for molecular weight and nmr measurements: dimethyl formamide, dimethyl acetamide, dimethyl sulfoxide, methylene chloride, chloroform, acetone, acetonitrile, carbon tetrachloride, methanol, ethanol, ethyl acetate, tetrahydrofuran and water.

*Analysis.*—Calcd. for $C_{44}H_{34}N_2O_2P_2S$ (percent): C, 73.72; H, 4.78; N, 3.91; P, 8.64; S, 4.47. Found (percent): C, 72.50; H, 4.99; N, 3.85; P, 8.42; S, 4.78.

An o-dichlorobenzene dispersion of 3.0 g. of the product prepared above was warmed at 180° for 5 min., giving a dark red-brown solution having $P^{31}$ nmr peaks at −42.2 p.p.m. and at −1.6 p.p.m. (area ratio, 4:3). The infrared spectrum had a strong absorption band at 4.9μ (cumulative region) for Xc.

The o-dichlorobenzene solution containing Xc was stirred under nitrogen as 1.0 g. of methyl iodide was added. After standing at room temperature for 8 days, the reaction mixture was diluted with ether, causing precipitation of 1.5 g. of orange solid. Recrystallization from diglyme-acetonitrile gave 0.2 g. of yellow solid, XIc, M.P. 230–233° dec. The $P^{31}$ nmr spectrum (in $CDCl_3$) had moderately broad peaks of about equal areas at −27.7 and +3.7 p.p.m.; the $H^1$ spectrum contained a complex aryl region at −7.0 to −8.4 p.p.m. (34H), two peaks centered at −6.23 p.p.m. (4H) (probably half of a p-disubstituted aryl pattern, the other half being masked by the major aryl complex), and a methyl doublet at −2.76 p.p.m. (3H), $J_{HP}$ 16.5 c.p.s. The infrared spectrum had bands at 5.85(w.), 6.18(s.), 6.35(s.), 6.60(s.), and 7.48μ(s.).

*Analysis.*—Calcd. for $C_{53}H_{41}IN_4O_4P_2$ (percent): C, 64.49; H, 4.19; I, 12.86; N, 5.68; P, 6.28. Found (percent): C, 64.21; H, 4.44; I, 12.76; N, 5.63; P. 6.06.

EXAMPLE 22

Compound XIa prepared in Example 19 when tested at 2 parts per million on *Aedes aegypti* had a $LD_{100}$ of 40 percent.

The foregoing examples and methods have been described in the foregoing specification for the purpose of illustration and not limitation. Many other modifications and ramifications will naturally suggest themselves to those skilled in the art based on this disclosure. These are intended to be comprehended within the scope of this invention.

Having thus described the invention what is desired to claim and secure by Letters Patent is:

1. Compounds of the formula

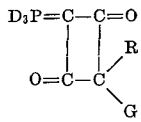

wherein each D is selected from the group consisting of alkyl, aryl, haloaryl, haloaralkyl, alkaryl, and aralkyl groups containing up to 20 carbon atoms and free of nonbenzoid unsaturation;

R is selected from the group consisting of hydrogen, aryl containing 6 to 10 carbon atoms and alkyl containing 1 to 6 carbon atoms;

G is selected from the group consisting of hydrogen, aryl containing from 6 to 10 carbon atoms, alkyl containing 1 to 6 carbon atoms and —P⊕$D_3$ X⊖ wherein X⊖ is I, Cl, Br, $BF_4$ or $PF_6$;

provided that when taken together R and G is

wherein T is selected from the group consisting of hydrogen, $CF_3$ and CN, and L is selected from the group consisting of aryl containing 6 to 10 carbon atoms and from zero to two substituents selected from the group consisting of halogen, CN, CHO and $NO_2$, and alkyl containing from 1 to 6 carbon atoms substituted with from zero to 13 fluorine atoms.

2. The compound 2,4-dioxo-1-methyl-3-triphenylphosphoranylidene-1-cyclobutyltriphenylphosphonium iodide.

References Cited

UNITED STATES PATENTS 3,105,096  9/1963  Welcher _____ 260—586 R

ALEX MAZEL, Primary Examiner

A. M. T. TIGHE, Assistant Examiner

U.S. Cl. X.R.

260—251 P, 256.4 E, 454, 464 R, 465 H, 465 R, 465 G, 566 F, 585.5, 599, 606.5 P; 252—8; 424—214